US011889043B2

(12) United States Patent
Tanaka et al.

(10) Patent No.: US 11,889,043 B2
(45) Date of Patent: Jan. 30, 2024

(54) IMAGE READING APPARATUS, IMAGE FORMING APPARATUS COMPRISING A FIRST IMAGING PORTION AND A SECOND IMAGING POTION THAT ARE CAUSED TO READ FIRST AND SECOND SIDES OF A MEDIUM IN PARALLEL TO GENERATE A SYNTHESIZED IMAGE INCLUDING FIRST IMAGE AND SECOND IMAGE READ FROM A FIRST IMAGING PORTION AND A SECOND IMAGING PORTION

(71) Applicant: KYOCERA Document Solutions Inc., Osaka (JP)

(72) Inventors: Kunihiko Tanaka, Osaka (JP); Tomohiro Kuwahara, Osaka (JP); Yoshiaki Yasui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/654,216

(22) Filed: Mar. 9, 2022

(65) Prior Publication Data
US 2022/0321730 A1    Oct. 6, 2022

(30) Foreign Application Priority Data

Mar. 30, 2021  (JP) ................................ 2021-057889
Mar. 30, 2021  (JP) ................................ 2021-057890

(51) Int. Cl.
*H04N 1/387*    (2006.01)
*H04N 1/203*    (2006.01)
(Continued)

(52) U.S. Cl.
CPC ......... *H04N 1/387* (2013.01); *H04N 1/02418* (2013.01); *H04N 1/1039* (2013.01);
(Continued)

(58) Field of Classification Search
CPC .... H04N 1/02418; H04N 1/1039; H04N 1/12; H04N 1/2036; H04N 1/387; H04N 2201/0081
(Continued)

(56) References Cited

U.S. PATENT DOCUMENTS

| 2002/0041407 | A1* | 4/2002 | Takahashi | H04N 1/2032 358/529 |
| 2007/0211295 | A1* | 9/2007 | Hosoi | H04N 1/387 358/1.18 |
| 2022/0303414 | A1* | 9/2022 | Yasui | H04N 1/00612 |

FOREIGN PATENT DOCUMENTS

JP    2007282193 A    10/2007
JP    2018198359 A  * 12/2018

\* cited by examiner

*Primary Examiner* — Chad Dickerson
(74) *Attorney, Agent, or Firm* — Alleman Hall Creasman & Tuttle LLP

(57) ABSTRACT

An image reading apparatus includes: a conveyance portion configured to convey a first medium; a first imaging portion; a first reading processing portion configured to cause the first imaging portion to read a first image of a first reading surface of the first medium conveyed by the conveyance portion; a second imaging portion; a second reading processing portion configured to cause the second imaging portion to read a second image of the second reading surface of the second medium by scanning while the second imaging portion is being moved along a second reading surface of a second medium placed on a medium placement surface; a reading control portion configured to control the first reading processing portion and the second reading processing portion to operate in parallel with each other; and a synthesis processing portion configured to generate a synthesized image by synthesizing the first image and the second image.

3 Claims, 8 Drawing Sheets

(51) Int. Cl.
  *H04N 1/024* (2006.01)
  *H04N 1/10* (2006.01)
  *H04N 1/12* (2006.01)
  *H04N 1/00* (2006.01)

(52) U.S. Cl.
  CPC ............. *H04N 1/12* (2013.01); *H04N 1/2036* (2013.01); *H04N 2201/0081* (2013.01)

(58) Field of Classification Search
  USPC .............................................. 358/1.11–1.18
  See application file for complete search history.

IMAGE READING APPARATUS, IMAGE FORMING APPARATUS COMPRISING A FIRST IMAGING PORTION AND A SECOND IMAGING POTION THAT ARE CAUSED TO READ FIRST AND SECOND SIDES OF A MEDIUM IN PARALLEL TO GENERATE A SYNTHESIZED IMAGE INCLUDING FIRST IMAGE AND SECOND IMAGE READ FROM A FIRST IMAGING PORTION AND A SECOND IMAGING PORTION

INCORPORATION BY REFERENCE

This application is based upon and claims the benefit of priority from the corresponding Japanese Patent Application No. 2021-057889 filed on Mar. 30, 2021, No. 2021-057890 filed on Mar. 30, 2021, the entire contents of which are incorporated herein by reference.

The present disclosure relates to an image reading apparatus which reads an image of a medium and an image forming apparatus.

BACKGROUND

Conventionally, there has been known an image reading apparatus which has a still document sheet reading function for reading an image of a document sheet (still document sheet) placed on a contact glass and a moving document sheet reading function for reading an image of a document sheet (moving document sheet) under conveyance by an automatic document feeder (ADF). As this kind of image reading apparatus, there has been proposed an image reading apparatus which reads an image of a still document sheet and thereafter, reads an image of a moving document sheet, and performs processing in which the former image is synthesized with the latter image.

SUMMARY

An image reading apparatus according to one aspect of the present disclosure includes: a conveyance portion configured to convey a first medium to a predetermined reading position; a first imaging portion provided in a first reading position on a conveyance path of the first medium; a first reading processing portion configured to cause the first imaging portion to read a first image of a first reading surface of the first medium conveyed by the conveyance portion; a second imaging portion provided below a medium placement surface; a second reading processing portion configured to cause the second imaging portion to read a second image of a second reading surface of a second medium by scanning while the second imaging portion is being moved along the second reading surface of the second medium placed on the medium placement surface; a reading control portion configured to control the first reading processing portion and the second reading processing portion to operate in parallel with each other; and a synthesis processing portion configured to generate a synthesized image by synthesizing the first image ready by the first reading processing portion and the second image read by the second reading processing portion.

An image reading apparatus according to another aspect of the present disclosure includes: a conveyance portion configured to convey a first medium to a predetermined reading position; a first imaging portion provided in a first reading position on a conveyance path of the first medium; a first reading processing portion configured to cause the first imaging portion to read a first reading surface of the first medium conveyed by the conveyance portion, to sequentially acquire a first line image, and to store the first line image in a predetermined storage portion; a second imaging portion provided below a medium placement surface; a second reading processing portion configured to cause the second imaging portion to read a second reading surface of a second medium by scanning while the second imaging portion is being moved along the second reading surface of the second medium placed on the medium placement surface, to sequentially acquire a second line image, and to store the second line image in the storage portion; a reading control portion configured to control the first reading processing portion and the second reading processing portion to operate in parallel with each other; and a synthesis processing portion configured to generate a synthesized image by sequentially synthesizing the first line image and the second line image in response to reading of the first line image and the second line image.

An image forming apparatus according to still another aspect of the present disclosure includes: the image reading apparatus and an image forming portion configured to form an image read by the image reading apparatus.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, with reference to the accompanying drawings, embodiments of the present disclosure will be described. Note that each of the embodiments described below is merely one example in which the present disclosure is embodied and does not limit the technical scope of the present disclosure. Note that in the below description, there may be a case where an up-down direction, a front-back direction, and a right-left direction shown in the diagram are used.

[First Embodiment]

Figure 1:
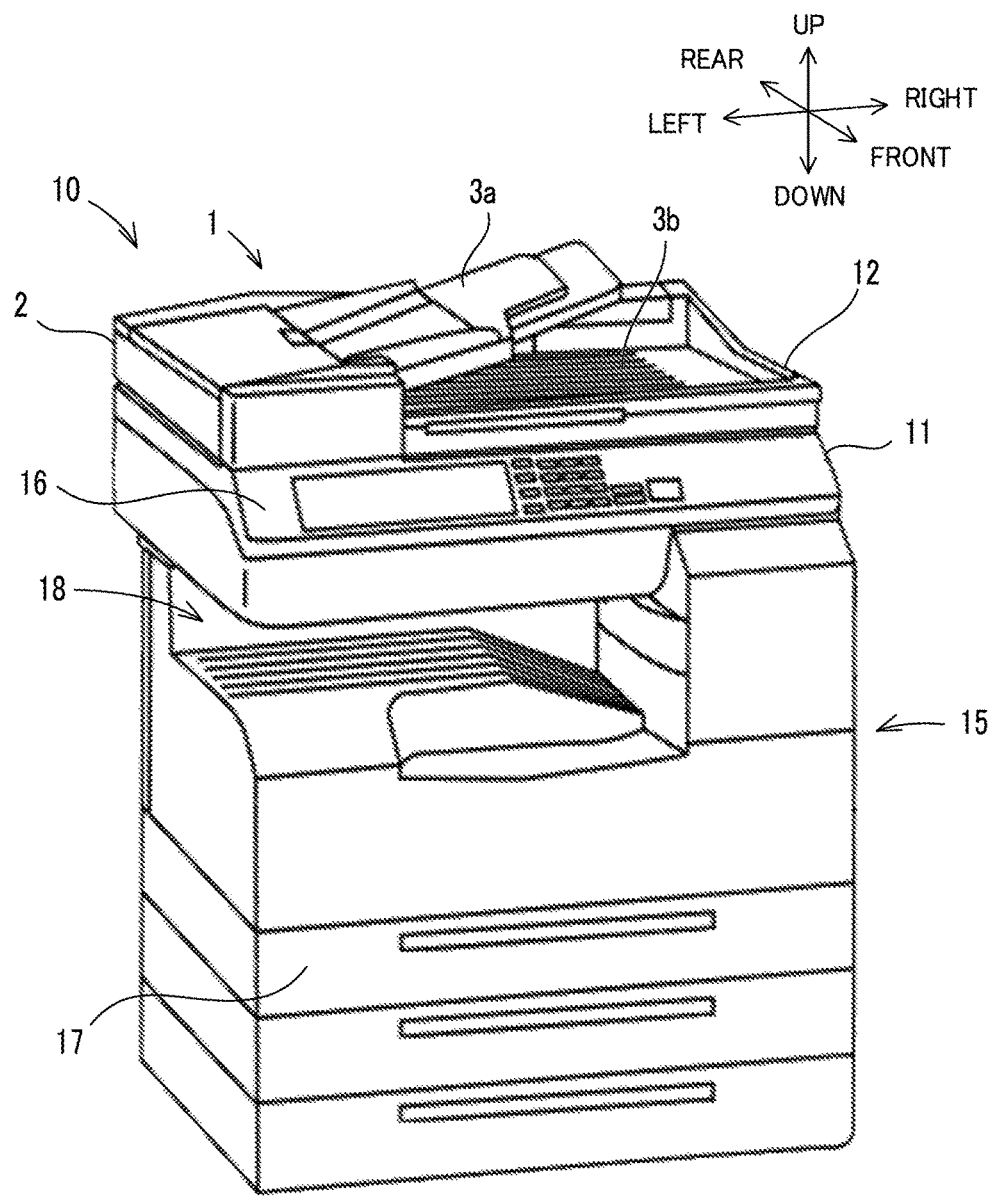
FIG. 1 is a perspective view showing an image forming apparatus which includes an image reading apparatus according to an embodiment of the present disclosure.
Figure 2:
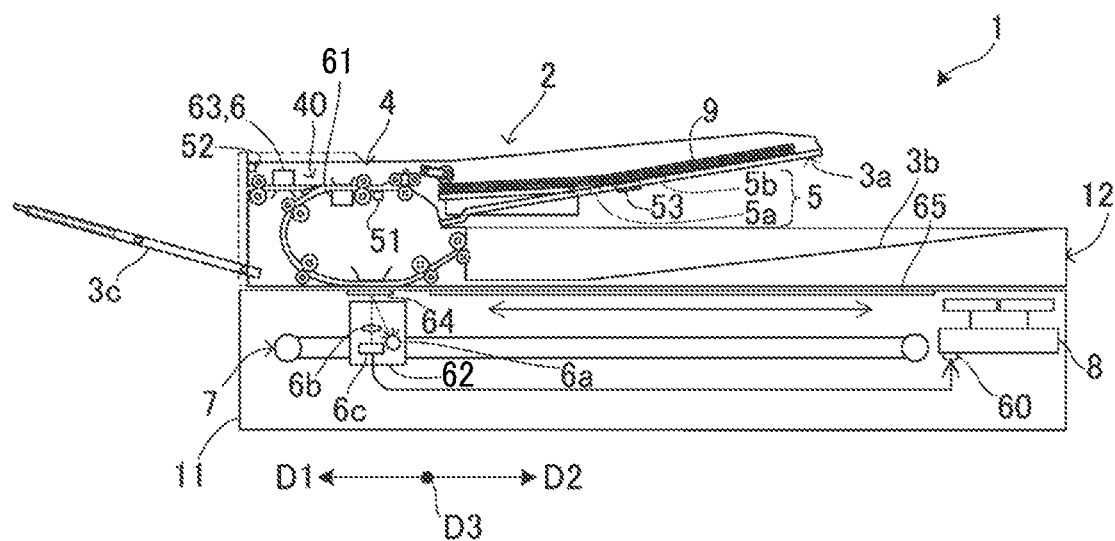
FIG. 2 is a diagram showing a configuration of the image reading apparatus according to the embodiment of the present disclosure.

Hereinafter, a first embodiment of the present disclosure will be described. First, with reference to FIG. 1 and FIG. 2, schematic configurations of an image reading apparatus 1 according to the first embodiment of the present disclosure and an image forming apparatus 10 which includes the image reading apparatus 1 will be described. FIG. 1 is a perspective view showing the image forming apparatus 10 and FIG. 2 is a diagram showing an internal configuration of the image reading apparatus 1.

[Image Forming Apparatus 10]

The image forming apparatus 10 is a multifunction peripheral which includes an image reading function, a facsimile function, an image forming function, and the like. As shown in FIG. 1, the image forming apparatus 10 includes the image reading apparatus 1, an image forming portion 15, an operation display portion 16, a sheet feed cassette 17, and a discharge portion 18. The operation display portion 16 is used also as an operation display portion of the image reading apparatus 1. Note that although in the present embodiment, the image forming apparatus 10 which includes the image reading apparatus 1 according to the present disclosure is described as an example, the present disclosure is not limited thereto. For example, the present disclosure may be an image reading apparatus 1 independent from the image forming apparatus 10 or may be a facsimile apparatus or a copying machine, which includes the image reading apparatus 1.

Based on image data outputted from the image reading apparatus 1 or image data inputted from an information processing apparatus such as an external personal computer, the image forming portion 15 executes color or monochrome image forming processing (printing processing) in accordance with an electrophotographic method. The image forming portion 15 includes an image forming unit, an exposure device, an intermediate transfer belt, a secondary transfer roller, a fixing device, and the like. The image forming unit includes a photoconductor drum, a charging device, a developing device, a primary transfer roller, a cleaning device (none of which is shown), and the like. These constituent components are provided in a housing of the image forming portion 15. Note that although in the present embodiment, the electrophotographic type image forming portion 15 is described as an example, the image forming portion 15 is not limited to the electrophotographic type image forming portion and may be an ink-jet recording type image forming portion or may be another recording type image forming portion or a printing type image forming portion.

[Image Reading Apparatus 1]

The image reading apparatus 1 is attached onto an upper part of the image forming apparatus 10. The image reading apparatus 1 reads an image from a document sheet. The image reading apparatus 1 can convey the document sheet and read the image of the conveyed document sheet (one example of a first medium) and can optically scan a document sheet (one example of a second medium) placed on an upper surface (one example of a medium placement surface) of a contact glass 65 (see FIG. 2) and read an image thereof. Hereinafter, the conveyed document sheet may be referred to as a moving document sheet and the document sheet placed on the contact glass 65 may be referred to as a still document sheet.

As shown in FIG. 1, the image reading apparatus 1 includes an apparatus main body 11 and a cover portion 12.

The apparatus main body 11 is a housing in which devices of the image reading apparatus 1 are stored. The cover portion 12 covers an upper surface of the apparatus main body 11 to press the still document sheet placed on the contact glass 65 (see FIG. 2) and is pivotably attached to the apparatus main body 11.

As shown in FIG. 2, the image reading apparatus 1 further includes an automatic document feeder (Auto Document Feeder: ADF) 2, a first reading portion 61 (one example of a first imaging portion in the present disclosure), a second reading portion 62 (one example of a second imaging portion in the present disclosure), a moving mechanism 7, a control device 8, a contact glass 64, a contact glass 65, and the like. These constituent components are stored in the apparatus main body 11 of the image reading apparatus 1.

The automatic document feeder 2 is provided in the cover portion 12. The automatic document feeder 2 takes out a document sheet 9 placed on a supply tray 3a and conveys, along a conveyance path 40, the document sheet to a reading position at which the document sheet is read by the image reading apparatus 1. In a case where a plurality of document sheets 9 are placed on the supply tray 3a, the automatic document feeder 2 takes out the plurality of document sheets one by one and conveys them continuously in sequence. This allows the image reading apparatus 1 to read an image from a document sheet conveyed by the automatic document feeder 2.

Each of the contact glass 64 and the contact glass 65 is attached to an upper part of the apparatus main body 11. Each of the contact glass 64 and the contact glass 65 is a transparent platy member. The contact glass 65 is a region where the still document sheet targeted for reading of the image is placed. The contact glass 64 is a region which transmits light radiated from the second reading portion 62 to the document sheet conveyed by the automatic document feeder 2.

In the image reading apparatus 1, upon input of a reading instruction in a state where a document sheet (still document sheet) is placed on the contact glass 65 and the cover portion 12 is closed, the second reading portion 62 is moved from a predetermined reference position to below the contact glass 65 by the moving mechanism 7 inside the apparatus main body 11 and is moved to a subscanning direction along a lower surface of the contact glass 65. Then, light radiated to the contact glass 65 while the second reading portion 62 is moving is scanned in the subscanning direction and thus, the image of the still document sheet is read.

In addition, in the image reading apparatus 1, when the image is read from the conveyed document sheet (moving document sheet) by the automatic document feeder 2, the second reading portion 62 is moved to a reference position (a position shown in FIG. 2) where the light is radiated to the contact glass 64, that is, a position below the contact glass 64. Then, light is radiated from a light emitting portion 6a of the second reading portion 62 to the contact glass 64 during conveying the moving document sheet and an image of the moving document sheet is read in a reading position P2 (see FIG. 3) above the reference position. The reading position P2 is in a position of an upper surface of the contact glass 64 and corresponds to a second reading position in the present disclosure.

In addition, in the image reading apparatus 1, upon input of an image synthesis instruction, the image of the document sheet conveyed by the automatic document feeder 2 is read by the first reading portion 61 provided in the conveyance path 40. In this case, the document sheet travels through the later-described second conveyance path 40d branching from the conveyance path 40 and is discharged outside.

As shown in FIG. 2, the automatic document feeder 2 includes the supply tray 3a (first tray), a first discharge tray 3b (second tray), the conveyance path 40, a conveying device 4 (one example of a conveyance portion in the present disclosure), a supplied document sheet detection portion 5, a conveyed document sheet sensor 51, a tray close sensor 52, and the like. The conveyance path 40 forms a passage through which the document sheet 9 is conveyed.

On each of the supply tray 3a and the first discharge tray 3b, the document sheet 9 can be placed. In the present embodiment, the first discharge tray 3b is disposed below the supply tray 3a.

The supplied document sheet detection portion 5 detects the document sheet 9 placed on the supply tray 3a. The supplied document sheet detection portion 5 includes a first supplied document sheet sensor 5a and a second supplied document sheet sensor 5b. The first supplied document sheet sensor 5a and the second supplied document sheet sensor 5b can detect the document sheet 9 placed on the supply tray 3a.

For example, each of the first supplied document sheet sensor 5a and the second supplied document sheet sensor 5b includes a first displacement member and a first detection sensor, which are not shown.

Upon receiving a load of the document sheet 9 on the supply tray 3a, the first displacement member is displaced from an upper position to a lower position below the upper position which is an initial position. The first detection sensor is, for example, a transmission type photo-interrupter and detects the first displacement member which has been displaced to the lower position.

The conveyed document sheet sensor 51 detects the document sheet 9 sent out from the supply tray 3a to the conveyance path 40. For example, the conveyed document sheet sensor 51 includes a second displacement member and a second detection sensor, which are not shown.

The second displacement member contacts the document sheet 9 sent out from the supply tray 3a to the conveyance path 40 and is thereby displaced from the initial position to a retracting position. The detection sensor is, for example, a transmission type photo-interrupter and detects the second displacement member which is displaced to the retracting position.

The conveying device 4 sends out the document sheets 9 on the supply tray 3a one by one to the conveyance path 40, further conveys the document sheets 9 along the conveyance path 40, and further discharges the document sheets 9 onto the first discharge tray 3b.

In the description given below, a vertical direction toward a direction in which the document sheets 9 are sent out from the supply tray 3a is referred to as a first direction D1 and a direction opposite to the first direction D1 is referred to as a second direction D2. In addition, a vertical direction which is orthogonal to the first direction D1 and the second direction D2 is referred to as a third direction D3.

Figure 3:
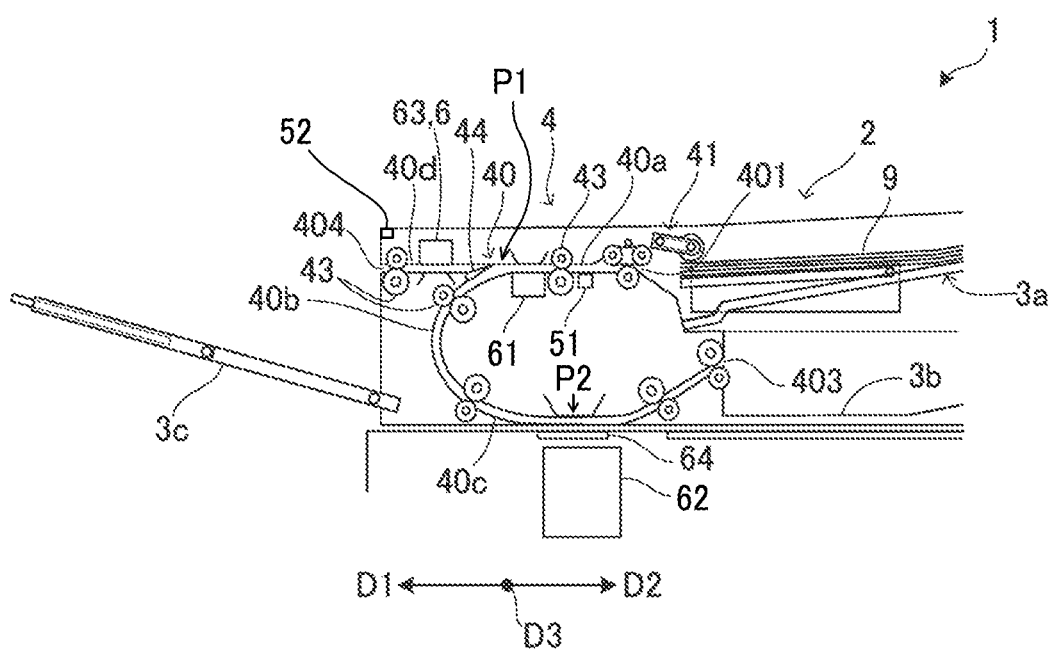
FIG. 3 is a diagram showing a configuration of an automatic document feeder in the image reading apparatus according to the embodiment of the present disclosure.

As shown in FIG. 3, the conveyance path 40 includes a carry-in passage 40a, a turn passage 40b (one example of a first conveyance path in the present disclosure), and a first conveyance path 40c (one example of a first conveyance path in the present disclosure). The carry-in passage 40a is a passage that extends from a carry-in entrance 401 corresponding to the supply tray 3a and heads toward the first direction D1. The conveyed document sheet sensor 51 detects a document sheet 9 which has been sent out to the carry-in passage 40a.

The turn passage 40b is connected to the carry-in passage 40a and is a curved passage which turns from the first direction D1 to the second direction D2. The first conveyance path 40c is a passage which is connected to the turn passage 40b, is continues toward the second direction D2, and reaches a first discharge outlet 403 (one example of a first discharge outlet in the present disclosure) corresponding to the first discharge tray 3b. The first conveyance path 40c extends via the reading position P2 (a position of reading made by the second reading portion 62) along the upper surface of the contact glass 64 and reaches the first discharge outlet 403. The first discharge outlet 403 is a discharge outlet of the first conveyance path 40c.

The conveying device 4 includes a sending-out mechanism 41 which copes with the supply tray 3a and a plurality of combinations of conveying roller pairs 43 arranged along the conveyance path 40.

The sending-out mechanism 41 sends out the document sheets 9 on the supply tray 3a one by one to the carry-in passage 40a. In the present embodiment, the sending-out mechanism 41 sends out a topmost document sheet 9 among the document sheets 9 on the supply tray 3a to the carry-in passage 40a.

The plurality of combinations of conveying roller pairs 43 are rotationally driven by a motor, not shown, and convey each of the document sheets 9 along the conveyance path 40.

The first reading portion 61 is provided for the carry-in passage 40a. The first reading portion 61 reads an image (one example of a first image) of a reading surface (one example of a first reading surface) of each of the document sheets 9, which passes along the carry-in passage 40a. Specifically, when each of the document sheets 9 has reached the reading position (first reading position) by the first reading portion 61 in the carry-in passage 40a, the first reading portion 61 radiates light to the reading surface of the document sheet 9 under conveyance and reads an image of the whole region of the reading surface of the document sheet 9. Data of the read image is temporarily stored in the later-described RAM 82 by a control portion 81.

The second reading portion 62 is provided below the contact glasses 64 and 65 so as to be movable in a right-left direction of the image reading apparatus 1. In a state in which the second reading portion 62 is disposed in the reference position (a position below the contact glass 64 shown in FIG. 3) corresponding to the contact glass 64, the second reading portion 62 reads the image of the reading surface of each of the document sheets 9, which passes along the first conveyance path 40c. The data of the read image is temporarily stored in the later-described RAM 82 by the control portion 81.

In addition, the second reading portion 62 reads an image (one example of a second image) of a reading surface of the still document sheet placed on the contact glass 65 (one example of a second reading surface). Specifically, the second reading portion 62 scans the reading surface of the still document sheet while moving to a right direction on a plane of FIG. 2 along the still document sheet placed on the contact glass 65, and the second reading portion 62 thereby reads the image of the whole region of the reading surface of the still document sheet. Data of the read image is temporarily stored in the later-described RAM 82 by the control portion 81.

In the present embodiment, each of the first reading portion 61 and the second reading portion 62 includes the light emitting portion 6a, a lens 6b, and an image sensor 6c (see FIG. 2). The light emitting portion 6a, the lens 6b, and the image sensor 6c are formed in such a way as to extend along the third direction D3.

In each of the first reading portion 61 and the second reading portion 62, the light emitting portion 6a radiates light to each of the document sheets 9. The lens 6b guides light reflected to each of the document sheets 9 to the image sensor 6c. The image sensor 6c is a line sensor which receives the light reflected to each of the document sheets 9, detects an intensity (an amount of the received light), and outputs a detection signal as a signal of the read image. In the present embodiment, line images of one line or a plurality of lines are sequentially read from a leading end of the reading surface of the document sheet by the line sensor, and detection signals in accordance with the read line images are sequentially outputted from the line sensor.

Each time the detection signal is outputted from the image sensor 6c, the detection signal is sequentially converted to digital image data (hereinafter, referred to as line image data) showing the line image and the line image data is sequentially stored in the RAM 82 (see FIG. 4) by the control portion 81 of the control device 8. This conversion processing may be performed by the control portion 81 or may be performed by a conversion processing portion which is different from the control portion 81. Each time the line image data is converted, the converted line image data is sequentially stored in the RAM 82. Then, when the line image has been read up to a trailing end of the document sheet, aggregate of all pieces of the line image data from the leading end of the document sheet up to the trailing end thereof is stored in the RAM 82 as the read image of the reading surface of the document sheet.

In an example shown in FIG. 2, each of the first reading portion 61 and the second reading portion 62 is a contact image sensor (CIS) in which the light emitting portion 6a, the lens 6b, and the image sensor 6c which is of a complementary metal oxide semiconductor (CMOS) type are integrated.

The moving mechanism 7 moves the second reading portion 62 over a range from the reference position (a position shown in FIG. 3) facing the contact glass 64 to a position facing the contact glass 65. The moving mechanism 7 transmits a driving force to a carriage (not shown) of the second reading portion 62 and moves the second reading portion 62. The moving mechanism 7 is the conventional well-known moving mechanism which uses a drive device (an electric motor) such as a stepping motor and is configured to be operable to move the carriage in a subscanning direction (a right-left direction in FIG. 2). The moving mechanism 7 has a transmission mechanism which includes a belt, pulleys, and gears which transmits the driving force from the drive device to the carriage.

In the present embodiment, in non-synthesis processing in which the later-described image synthesis processing is not performed, when a document sheet 9 is conveyed by the conveying device 4, the moving mechanism 7 retains the second reading portion 62 in the reference position facing the contact glass 64. Thus, the light of the light emitting portion 6a of the second reading portion 62 is radiated to the reading surface of the document sheet 9 that moves on the contact glass 64, and the reflected light enters the image sensor 6c. This allows the image sensor 6c to read the image of the document sheet 9 under conveyance.

In addition, upon the non-synthesis processing, in a case where each of the document sheets 9 is placed on the contact glass 65, the moving mechanism 7 moves the second reading portion 62 along the contact glass 65. Thus, while the light of the light emitting portion 6a of the second reading portion 62 scans each of the document sheets 9 on the contact glass 65, the image sensor 6c of the second reading portion 62 reads the image of each of the document sheets 9.

In addition, upon synthesis processing in which the later-described image synthesis processing is performed, the light of the light emitting portion 6a of the first reading portion 61 is radiated to the reading surface of each of the document sheets 9, which moves on the contact glass 64, and the reflected light enters the image sensor 6c. Thus, the image sensor 6c reads the image of each of the document sheets 9 under conveyance. In addition, concurrently, the second reading portion 62 is moved along the contact glass 65, and while the light of the light emitting portion 6a of the second reading portion 62 scans each of the document sheets 9 on the contact glass 65, the image sensor 6c of the second reading portion 62 reads the image of each of the document sheets 9.

Note that the image sensor 6c of the second reading portion 62 may be a charge coupled device (CCD) type sensor. In this case, the moving mechanism 7 moves the light emitting portion 6a and the lens 6b, and the CCD type image sensor 6c is fixed in a previously determined position.

The operation display portion 16 includes an operation portion which accepts operation of a person. The operation portion is, for example, operation buttons, a touch panel, or the like. For example, the operation portion accepts inputting of signals of an image synthesis instruction to execute the later-described image synthesis processing, a synthesis interruption instruction to interrupt the image synthesis processing, a resumption instruction to resume the interrupted image synthesis processing, and the like. In other words, in the operation portion, a reading execution key (start button) to input the image synthesis instruction and the resumption instruction, a cancel key to interrupt the image synthesis processing, and the like are arranged. In addition, the operation display portion 16 includes a display portion which displays various pieces of information. The display portion is, for example, a panel display device such as a liquid crystal display unit.

In the present embodiment, the automatic document feeder 2 further includes a second discharge tray 3c on which the document sheets 9 can be placed (see FIG. 2 and FIG. 3).

As shown in FIG. 3, the second discharge tray 3c is disposed in a position away from the supply tray 3a and the first discharge tray 3b in the first direction D1. The second discharge tray 3c is foldable along an outer edge of the cover portion 12.

In addition, the conveyance path 40 further includes a second conveyance path 40d (one example of a second conveyance path in the present disclosure). The second conveyance path 40d is a passage which is connected to the carry-in passage 40a, extends in the first direction D1, and reaches a second discharge outlet 404 (one example of a second discharge outlet in the present disclosure) corresponding to the second discharge tray 3c. The second conveyance path 40d extends in such a way as to be continuous from the carry-in passage 40a and to extend substantially straight toward the first direction D1.

That is to say, the conveyance path 40 branches from the carry-in passage 40a to the turn passage 40b and the second conveyance path 40d. In other words, the conveyance path 40 branches from a branch point P1 (see FIG. 3) in the vicinity of an end point of the carry-in passage 40a to the turn passage 40b and the second conveyance path 40d.

In the description given below, a passage of the conveyance path 40 extending from the carry-in passage 40a via the turn passage 40b to the first conveyance path 40c is referred to as a curved conveyance path 40a-40c. In addition, a passage of the conveyance path 40 extending from the carry-in passage 40a to the second conveyance path 40d is referred to as a straight conveyance path 40a-40d.

The second discharge tray 3c is supported so as to be displaceable between a closing position where the second discharge tray 3c closes the second discharge outlet 404 and an opening position where the second discharge tray 3c opens the second discharge outlet 404. The second discharge outlet 404 is a discharge outlet of the second conveyance path 40d. The document sheets 9 are stacked on the second discharge tray 3c when the second discharge tray 3c is located at the opening position.

The tray close sensor 52 detects a tray close state in which the second discharge tray 3c is present in the closed position. For example, the tray close sensor 52 is a contact type limit sensor or a non-contact type photosensor, which detects the second discharge tray 3c in the closed position, or the like. The tray close sensor 52 is one example of a tray close detection portion.

In addition, the automatic document feeder 2 includes a route switch mechanism 44 (one example of a route switch portion in the present disclosure).

The route switch mechanism 44 selectively guides each of the document sheets 9 conveyed along the carry-in passage 40a to either one of the turn passage 40b and the second conveyance path 40d. In other words, the route switch mechanism 44 selects either one of the curved conveyance path 40a-40c and the straight conveyance path 40a-40d as a conveying route along which each of the document sheets 9 is conveyed.

The route switch mechanism 44 is a flap which is swingably supported at the branch point P1 of the conveyance path 40. Upon reception of an external force, the flap is displaced between a predetermined first position and a predetermined second position. At the first position, the flap guides the document sheet 9 to the turn passage 40b to be conveyed by the conveying device 4. At the second position, the flap guides the document sheet 9 to the second conveyance path 40d. In other words, the route switch mechanism 44 (flap) is displaced between the first position where it guides a document sheet 9 conveyed along the conveyance path 40 to the turn passage 40b and the second position where it guides the document sheet 9 to the second conveyance path 40d. When the route switch mechanism 44 is disposed at the first position, the curved conveyance path 40a-40c is opened. When the route switch mechanism 44 is disposed at the second position, the straight conveyance path 40a-40d is opened.

When with the route switch mechanism 44 disposed in the first position, the sending-out mechanism 41 of the conveying device 4 and the plurality of combinations of conveying roller pairs 43 operate, each of the document sheets 9 is conveyed toward the turn passage 40b and is discharged from the first discharge outlet 403 to the first discharge tray 3b.

In addition, when with the route switch mechanism 44 disposed in the second position, the sending-out mechanism 41 of the conveying device 4 and the plurality of combinations of conveying roller pairs 43 operate, each of the document sheets 9 is conveyed toward the second conveyance path 40d and is discharged from the second discharge outlet 404 to the second discharge tray 3c.

When the second discharge tray 3c is in the closed position, the route switch mechanism 44 is biased to a side of the first position by a biasing member such as a spring and is disposed in the first position. In addition, in a case where the second discharge tray 3c is displaced from the closed position to the opened position, the route switch mechanism 44 is displaced from the first position to the second position and is disposed in the second position.

For example, in a case where the route switch mechanism 44 receives an actuating force from an actuator or a link member, which operates in conjunction with the displacement of the second discharge tray 3c from the closed position to the opened position and is displaced from the first position to the second position, and the second discharge tray 3c is returned to the closed position, the route switch mechanism 44 is configured to be returned to the first position by a biasing force by the biasing member.

Alternatively, the route switch mechanism 44 may be configured to be displaced from the first position to the second position by a driving portion (a solenoid or a motor), not shown, in a case where the tray close sensor 52 detects that the second discharge tray 3c is displaced from the closed position to the opened position, and to be returned to the first position by the biasing member in a case where the second discharge tray 3c is returned to the closed position.

Note that the image reading apparatus 1 further includes a third reading portion 63. In this case, the third reading portion 63 reads an image of each of the document sheets 9 passing along the second conveyance path 40d. A configuration of the third reading portion 63 is the same as the configuration of the first reading portion 61. In a case where the third reading portion 63 is provided, in the later-described first reading processing, the third reading portion 63 may be caused to read other reading surface of each of the document sheets 9.

[Control Device 8]

Figure 4:
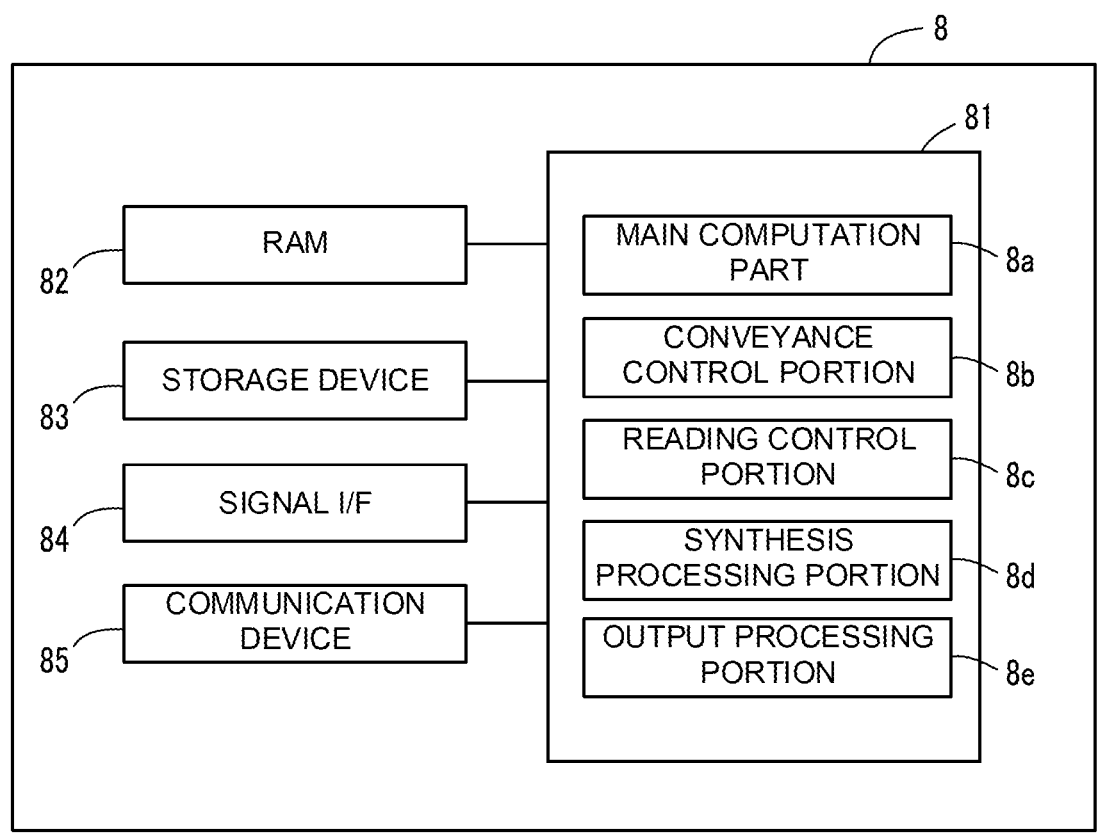
FIG. 4 is a block diagram showing a configuration of a control device in the image reading apparatus according to the embodiment of the present disclosure.

The control device 8 executes various data processing and control of the image reading apparatus 1. As shown in FIG. 4, the control device 8 includes a control portion 81, a random access memory (RAM) 82, a storage device 83, a, signal interface 84, and the like. Furthermore, the control device 8 also includes a communication device 85 which communicates with other devices. The RAM 82 is one example of a storage portion.

The storage device 83 is a computer-readable non-volatile storage device. The storage device 83 is operable to store and update the computer program and various pieces of data. For example, one or both of a flash memory and a hard disc drive are adopted as the storage device 83.

The signal interface 84 converts a signal outputted by each of various sensors to digital data and transmits the digital data after the conversion to the control portion 81. Furthermore, the signal interface 84 converts a control instruction outputted by the control portion 81 to a control signal and transmits the control signal to a device targeted for control.

The control portion 81 has a computing device such as a central processing unit (CPU). The control portion 81 is a processor which executes the computer program and thereby executes various data processing and control. The RAM 82 is a computer-readable volatile storage device. The RAM 82 temporarily stores the computer program executed by the CPU of the control portion 81 and data which is outputted and referenced in processes in which the CPU of the control portion 81 executes various processing.

The control portion 81 includes a plurality of processing portions which are realized by execution of the computer program by the CPU. Specifically, the control portion 81 includes a main computation part 8a, a conveyance control portion 8b, a reading control portion 8c, a synthesis processing portion 8d, an output processing portion 8e, and the like. The reading control portion 8c is one example of each of the reading control portion, the first reading processing portion, the second reading processing portion, and the third reading processing portion in the present disclosure. The synthesis processing portion 8d is one example of a synthesis processing portion in the present disclosure. The output processing portion 8e is one example of an output processing portion in the present disclosure.

Note that the processing portions are not limited to processing portions realized by the control portion 81 and may be processing portions realized by, for example, a plurality of processors. In addition, the processing portions are not limited to the processing portions realized by the control portion 81 and may be configured by, for example, electronic circuitry which can realize functions of the processing portions.

The main computation part 8a executes control to start various processing in accordance with operation to the operation portion of the operation display portion 16, control to display information on the display portion of the operation display portion 16, and the like.

The conveyance control portion 8b controls the conveying device 4, thereby controlling conveyance of the document sheets 9.

Specifically, the conveyance control portion 8b controls the conveying device 4 and the like so as to enable conveyance operation (turn conveyance operation) in which each of the document sheets 9 on the supply tray 3a is conveyed via the turn passage 40b and is discharged to the first discharge tray 3b. Note that in this case, the route switch mechanism 44 is disposed in the first position and the second discharge tray 3c is disposed in the closed position. The control is performed as mentioned above, thereby conveying each of the document sheets 9 on the supply tray 3a one by one along the curved conveyance path 40a-40c and discharging each of the document sheets 9 onto the first discharge tray 3b.

In addition, the conveyance control portion 8b controls the conveying device 4 and the like so as to enable conveyance operation (straight conveyance operation) in which each of the document sheets 9 on the supply tray 3a is conveyed along the conveyance path branching before the turn passage 40b and is discharged onto the second discharge tray 3c which is different from the first discharge tray 3b. Note that in this case, the route switch mechanism 44 is disposed in the second position and the second discharge tray 3c is disposed in the opened position. The control is performed as mentioned above, thereby conveying each of the document sheets 9 on the supply tray 3a one by one along the straight conveyance path 40a-40d and discharging each of the document sheets 9 onto the second discharge tray 3c.

The reading control portion 8c controls the first reading portion 61, the second reading portion 62, and the like, thereby causing the image reading processing to be executed.

Specifically, the reading control portion 8c executes processing in which the first reading portion 61 is caused to read an image of a reading surface of each of the document sheets 9 conveyed by the conveying device 4 (hereinafter, referred to as first reading processing). In the present embodiment, in a case where the image synthesis instruction to execute the later-described image synthesis processing is inputted, the reading control portion 8c causes the first reading portion 61 to reach an image (first image) of each of the document sheets 9. In this case, the reading control portion 8c functions as a first reading processing portion in the present disclosure.

In addition, in a case where a plurality of document sheets 9 are sequentially conveyed by the conveying device 4, the reading control portion 8c causes the first reading portion 61 to sequentially read images of reading surfaces of the document sheets 9.

In addition, the reading control portion 8c causes the second reading portion 62 to scan while moving the second reading portion 62 along the reading surface of the still document sheet placed on the contact glass 65, thereby executing processing in which the second reading portion 62 is caused to read an image (second image) of the still document sheet (hereinafter, referred to as second reading processing). In the present embodiment, in a case where the image synthesis instruction to execute the later-described image synthesis processing is inputted or in a case where upon the non-synthesis processing, the reading instruction of the still document sheet is inputted, the reading control portion 8c causes the second reading portion 62 to read the image (second image) of the still document sheet. In this case, the reading control portion 8c functions as a second reading processing portion in the present disclosure.

In addition, the reading control portion 8c executes processing in which the second reading portion 62 is caused to read an image of a reading surface of each of the document sheets 9 conveyed by the conveying device 4 (hereinafter, referred to as third reading processing). In the present embodiment, in a case where upon the non-synthesis processing, the reading instruction of each of the document sheets 9 by the automatic document feeder 2 is inputted, the reading control portion 8c causes the second reading portion 62 to read the image of each of the document sheets 9. In this case, the reading control portion 8c functions as a third reading processing portion in the present disclosure.

In addition, in a case where the image synthesis instruction to execute the image synthesis processing is inputted, the reading control portion 8c executes the first reading processing and the second reading processing in parallel with each other.

In the present embodiment, in a case where the image synthesis instruction is inputted and the route switch mechanism 44 is disposed in the second position, the reading control portion 8c executes the first reading processing and the second reading processing in parallel with each other.

In a case where the image synthesis instruction is inputted, the synthesis processing portion 8d executes processing in which a synthesized image is generated by synthesizing the image of each of the document sheets 9, which is read by the first reading portion 61 in the first reading processing and the image, which is read by the second reading portion 62 in the second reading processing (synthesized image generation processing). As a synthesis processing method, alpha blending in which images are synthesized by using a values, each of which is a coefficient showing a degree of transmittance, can be used.

For example, in a case where images of the plurality of document sheets 9 conveyed by the conveying device 4 are sequentially ready, the synthesis processing portion 8d performs processing in which each of the images of the reading surfaces of the document sheets 9 is synthesized with an image of one still document sheet read in the second reading processing.

In addition, in a case where the synthesis interruption instruction is inputted from the operation display portion 16; in response to this input, the image synthesis processing (see FIG. 5) executed by the image reading apparatus 1 is interrupted; and in response to the resumption instruction, the image synthesis processing is resumed, the reading control portion 8c executes the second reading processing again and causes the second reading portion 62 to read an image of the still document sheet.

In this case, it is preferable that the reading control portion 8c determines whether or not each of the document sheets on the contact glass 65 is changed and in a case where it is determined that the change is made, the reading control portion 8c executes the second reading processing again and causes the second reading portion 62 to read an image of the still document sheet.

The output processing portion 8e outputs image data read in the reading processing by the reading control portion 8c and image data (synthesized image data) of the synthesized image generated by the synthesis processing portion 8d. Specifically, the output processing portion 8e stores the image data in the storage device 83 and outputs the image data to the image forming portion 15 or outputs the image data to the display portion of the operation display portion 16 or outputs the image data to an external information processing device or an external storage device.

In the meantime, since the conventional image reading apparatus performs processing in which a still document sheet and a moving document sheet are separately read by using the same reading portion, it takes time to perform the image synthesis processing and a processing efficiency is poor. In contrast to this, since the image reading apparatus 1 in the present embodiment concurrently reads the still document sheet and the moving document sheet in the later-described image synthesis processing and the read images are synthesized, it is made possible to efficiently read the images to be synthesized.

[Image Synthesis Processing]

Figure 5:
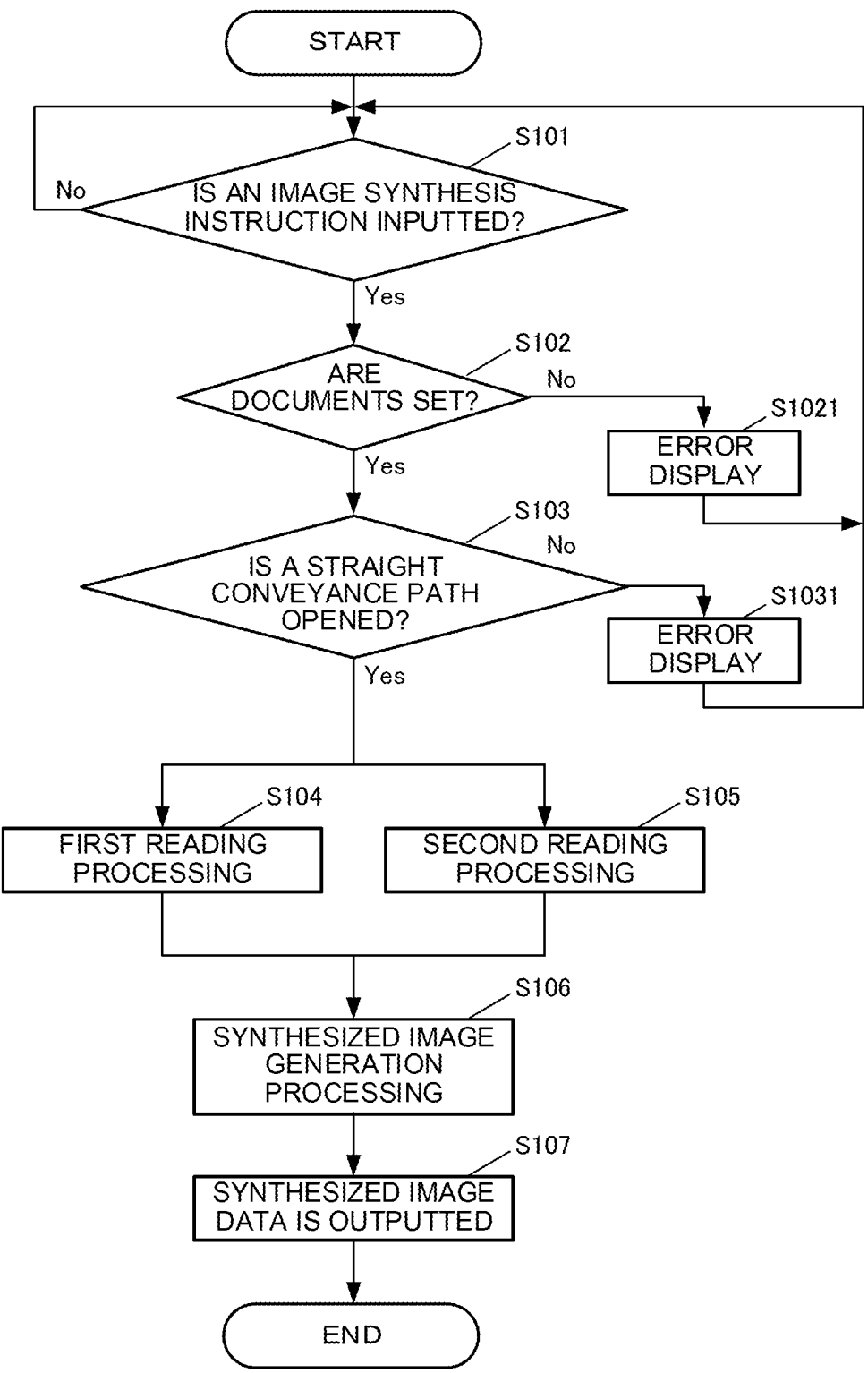
FIG. 5 is a flowchart showing one example of a procedure of image synthesis processing in the image reading apparatus according to the embodiment of the present disclosure.

Hereinafter, with reference to a flowchart in FIG. 5, one example of a procedure of the image synthesis processing executed by the control portion 81 of the control device 8 will be described. Note that in the description given below, it is defined that in the image reading apparatus 1, an image synthesis function is set to be effective and a background density, magnification, a document sheet size, color selection, kinds of document sheets, selection of base images, and the like, which are needed for the image synthesis processing, are already set.

In a state in which the image synthesis function is set to be effective, it is determined whether or not the image synthesis instruction to execute the image synthesis processing is inputted (S101). In the present embodiment, in a case where in the image reading apparatus 1, in the state in which the image synthesis function is set to be effective, the reading execution key (start button) is operated to be pressed by an operator from the operation portion of the operation display portion 16, the control portion 81 determines that the image synthesis instruction has been inputted.

When the image synthesis instruction has been inputted, in the next step S102, the control portion 81 determines whether or not a document sheet targeted for reading is set on the supply tray 3a and the contact glass 65. Specifically, the control portion 81 determines whether or not the document sheet 9 targeted for reading is placed on the supply tray 3a and determines whether or not a still document sheet targeted for reading is placed on the contact glass 65. In other words, the control portion 81 detects presence/absence of the document sheet on each of the supply tray 3a and the contact glass 65. Here, the presence/absence of each of the document sheets 9 on the supply tray 3a can be detected by the supplied document sheet detection portion 5. In addition, the presence/absence of the still document sheet on the contact glass 65 can be detected by, for example, a document sheet detection sensor (document sheet detection portion) such as a reflection-type photo-interrupter, which is provided for a pressing surface of the cover portion 12. For example, the second reading portion 62 is moved below the contact glass 65 immediately after closing the cover portion 12 and light is radiated to a predetermined width region in an end part on a side of the first direction D1 of the contact glass 65 (an end part on a side of the automatic document feeder 2), thereby also allowing the presence/absence of the still document sheet to be determined based on a light receiving amount of reflected light of the radiated light or image data of the predetermined width region, converted from the light receiving amount.

In step S102, in a case where it is determined that the document sheets are not set on both of the supply tray 3a and the contact glass 65, that is, in a case where it is determined that the document sheet or document sheets are not set on either one or both of the supply tray 3a and the contact glass 65, the control portion 81 displays an error message, which prompts setting of the document sheets on both thereof, on the display portion of the operation display portion 16 (S1021). Thereafter, the processing returns to step S101 and the processing in step S101 and subsequent processing are performed.

On the other hand, in step S102, in a case where it is determined that the document sheets are set on both of the supply tray 3a and the contact glass 65, subsequently, the control portion 81 determines whether or not the straight conveyance path 40a-40d is opened (S103). For example, in a case where the second discharge tray 3c is disposed in the opened position and the route switch mechanism 44 is disposed in the second position, it is determined that the straight conveyance path 40a-40d is opened.

The opened position of the second discharge tray 3c can be determined based on an output signal of the tray close sensor 52. In addition, in a case where the route switch mechanism 44 is operated by a predetermined driving portion, the opened position thereof can be determined by whether or not a driving control signal by the control portion 81 is outputted. In addition, in a case where the route switch mechanism 44 is displaced to the first position or the second position in conjunction with opening/closing operation of the second discharge tray 3c, the control portion 81 may determine that the straight conveyance path 40a-40d is opened in a case where it is determined that the second discharge tray 3c is displaced in the opened position.

In step S103, in a case where it is determined that the straight conveyance path 40a-40d is not opened, the control portion 81 displays an error message which indicates that the second discharge tray 3c is in the closed position and an error message which prompts displacing of the second discharge tray 3c in the opened position and opening of the straight conveyance path 40a-40d on the display portion of the operation display portion 16 (S1031). Thereafter, the processing returns to step S101 and the processing in step S101 and subsequent processing are performed.

Note that in the present embodiment, in a state in which the image synthesis function is set to be effective, the document sheets 9 conveyed by the conveying device 4 are conveyed to the straight conveyance path 40a-40d and are not conveyed to the curved conveyance path 40a-40c.

Accordingly, unless the straight conveyance path 40a-40d is opened, the first reading processing in step S104 and the second reading processing in step S105 are not executed and the synthesized image generation processing in the step S106 is also not executed.

In step S103, in a case where it is determined that the straight conveyance path 40a-40d is opened, the control portion 81 executes the first reading processing in step S104 and the second reading processing in step S105 in parallel with each other. As described above, the first reading processing is processing in which the conveying device 4 is operated and the first reading portion 61 is caused to read an image of a reading surface of the document sheet 9 conveyed by the conveying device 4. In addition, the second reading processing is processing in which the second reading portion 62 is caused to read an image of a reading surface of the still document sheet placed on the contact glass 65. In the present embodiment, since the straight conveyance path 40a-40d is opened, the image of the document sheet 9 conveyed by the conveying device 4 is read by the first reading portion 61 in the carry-in passage 40a; thereafter, is guided to the second conveyance path 40d by the route switch mechanism 44; and is discharged from the second discharge outlet 404 to the second discharge tray 3c.

Data of the read images ready in the first reading processing and the second reading processing is temporarily stored in the RAM 82 until the image synthesis processing is finished.

Thereafter, in step S106, the control portion 81 executes processing (synthesized image generation processing) in which a synthesized image is generated by synthesizing the image (read image) of the document sheet 9, read in the first reading processing in step S104, and the image (read image) of the still document sheet, read in the second reading processing in step S105. For example, in a case where the image of the still document sheet is set as the base image (background image), the read image of the still document sheet as the background image of the image of the document sheet 9 is synthesized with the read image of the document sheet 9. In addition, in a case where the image of the document sheet 9 is set as the base image (background image), the read image of the document sheet 9 as the background image of the image of the still document sheet is synthesized with the read image of the still document sheet. Synthesized image data generated by the synthesized image generation is stored and kept in the storage device 83.

Subsequently, in step S107, the control portion 81 performs processing in which f the synthesized image data generated in step S106 is outputted. Note that an output destination of the synthesized image data is the display portion of the operation display portion 16 in a case where there is a display request, the output destination thereof is a processing portion which executes the image forming processing in a case where there is an image formation request, and the output destination thereof is an information processing device, a storage device, or the like as a transfer destination in a case where there is a data transfer request. Thus, a series of image synthesis processing is finished.

Note that in a case where the plurality of document sheets 9 are placed on the supply tray 3a, by repeatedly executing the processing in step S104 and step 105 and the subsequent processing, all the document sheets 9 can be synthesized with the image of the still document sheet

[First Modified Example of Image Synthesis Processing]

Figure 6:
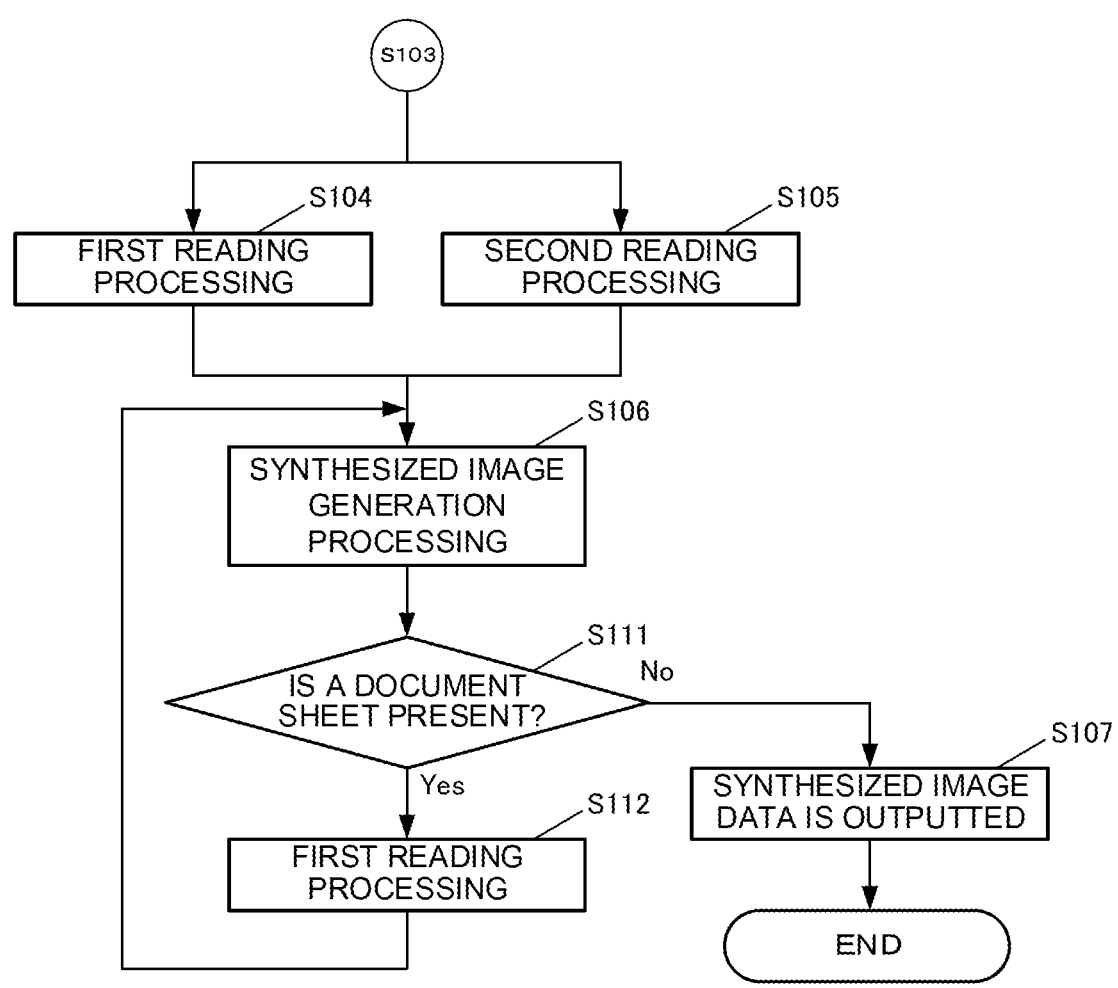
FIG. 6 is a flowchart showing a modified example of the image synthesis processing in the image reading apparatus according to the embodiment of the present disclosure.

In the present embodiment, as to the above-described image synthesis processing, the processing example in which in the case where the plurality of document sheets 9 are placed on the supply tray 3a, the processing in step S104 and step S105 and the subsequent processing are performed for each of the document sheets 9 is described. However, the present disclosure is not limited to the above-mentioned processing example. For example, as shown in FIG. 6, the second reading processing of the still document sheet on the contact glass 65 may be performed only once and each time the image of the reading surface of each of the document sheets 9 is read, the read image of each of the document sheets 9 may be synthesized with the read image of the still document sheet. Note that in FIG. 6, the same step numbers are provided for the processes of the same or equivalent procedure in the above-described image synthesis processing, thereby omitting detailed description.

Specifically, as shown in FIG. 6, after the determination processing in step S101 and step S102, the control portion 81 determines that the straight conveyance path 40a-40d is opened (Yes in S103) and executes the first reading processing of the first document sheet 9 (S104) and the second reading processing of the still document sheet (S105) in parallel with each other. Thereafter, the control portion 81 executes the synthesized image generation processing (S106). After executing the synthesized image generation processing, in step S111, the control portion 81 determines whether or not the next document sheet 9 is present on the supply tray 3a of the automatic document feeder (ADF) 2.

In a case where after conveying the first document sheet 9, it is detected by the supplied document sheet detection portion 5 that the document sheet 9 is present on the supply tray 3a, the control portion 81 determines that a next second document sheet 9 is present on the supply tray 3a. In step S111, in a case where it is determined that the next second document sheet 9 is present on the supply tray 3a, the control portion 81 operates the conveying device 4, conveys the document sheet 9 from the supply tray 3a, and executes the first reading processing again (S112). In this case, the control portion 81 does no execute the second reading processing and causes the second reading portion 62 to stand by in the reference position.

Thereafter, returning to step S106, the control portion 81 execute processing in which the synthesized image is generated by synthesizing the read image of the second document sheet 9 and the read image (the read image in step S105) of the still document sheet, stored in the RAM 82. Note that the processing from step S112 to step S106 is repeated until it is determined in step S111 that no document sheet 9 is present on the supply tray 3a.

When it is determined in step S111 that no document sheet 9 is present on the supply tray 3a, the control portion 81 performs processing in which the synthesized image data generated in step S106 is outputted (S107).

[Second Modified Example of Image Synthesis Processing]

Figure 7:
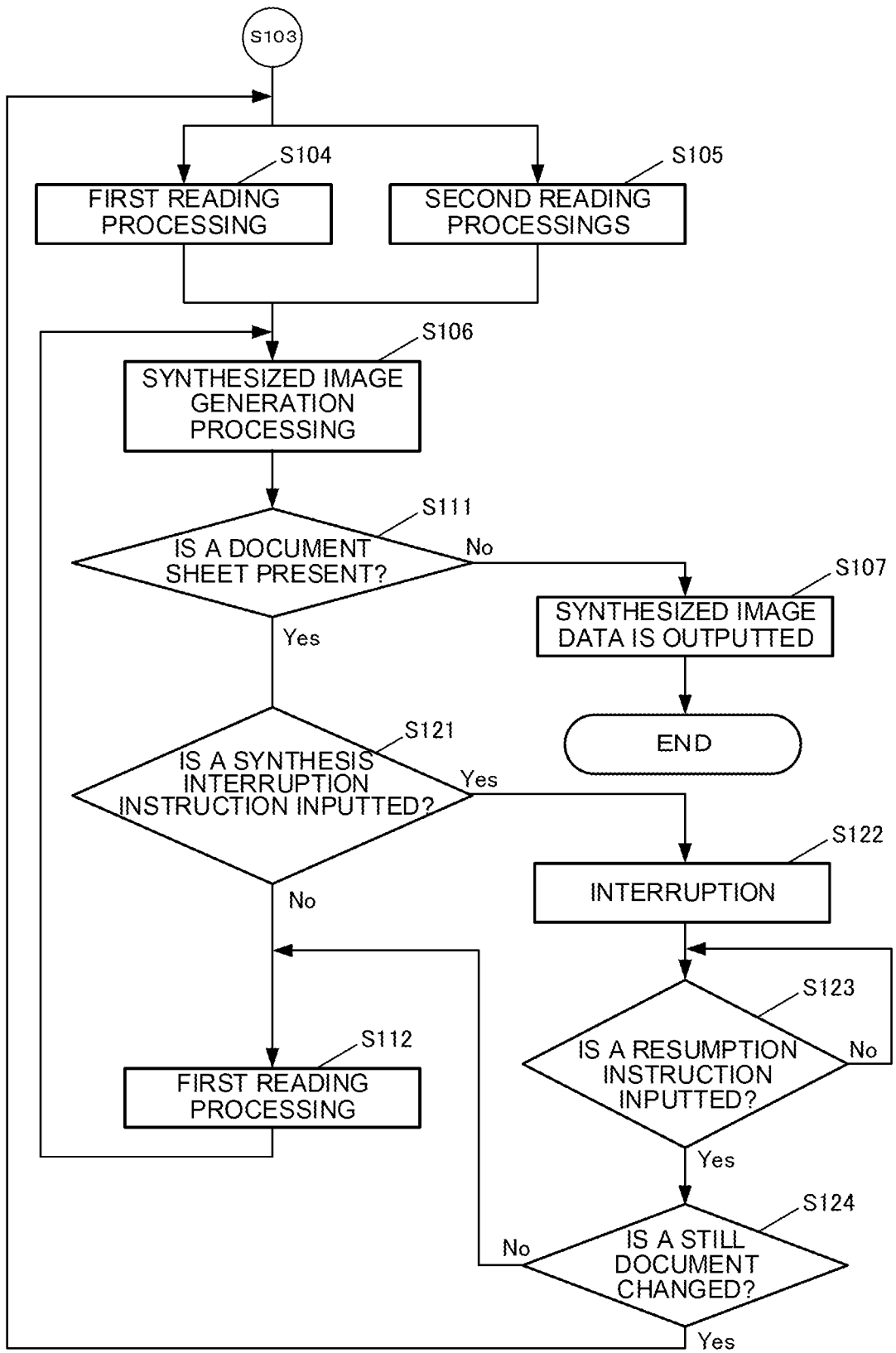
FIG. 7 is a flowchart showing other modified example of the image synthesis processing in the image reading apparatus according to the embodiment of the present disclosure.

In a case where during executing the image synthesis processing in the above-described embodiment, the synthesis interruption instruction is inputted, it is highly likely that the still document sheets on the contact glass 65 are replaced with other document sheets. In this case, as shown in FIG. 7, the second reading processing in step S105 may be executed again and an image of the still document sheet may be read. Note that in FIG. 7, the same step numbers are provided for the processes of the same or equivalent procedure in the above-described image synthesis processing, thereby omitting detailed description.

Specifically, as shown in FIG. 7, after executing the processing in step S101 to step S106 and further executing the determination processing in step S111, in a subsequent step S121, the control portion 81 determines whether or not the synthesis interruption instruction to interrupt the image synthesis processing is inputted. In the present embodiment, in the case where in the state in which in the image reading apparatus 1, the image synthesis function is set to be effective, the cancel key is operated to be pressed by the operator from the operation portion of the operation display portion 16, the control portion 81 determines that the synthesis interruption instruction is inputted. Note that in a case where it is detected by a sensor or the like that during the image synthesis processing, the cover portion 12 is opened, the control portion 81 may determine that the synthesis interruption instruction is inputted.

When the synthesis interruption instruction is inputted, after finishing the conveyance of the document sheet 9 currently being executed, the reading processing (S104, S105, and S112), and the synthesized image generation processing (S106), the control portion 81 interrupts the series of image synthesis processing (S122).

Thereafter, the control portion 81 determines whether or not the resumption instruction to resume the image synthesis processing is inputted (S123). In the present embodiment, in the case where in the state in which in the image reading apparatus 1, the image synthesis processing is interrupted, the reading execution key (start button) is operated to be pressed by the operator from the operation portion of the operation display portion 16, the control portion 81 determines that the resumption instruction is inputted.

When the resumption instruction is inputted, in a subsequent step S124, the control portion 81 determines whether or not the still document sheets on the contact glass 65 are changed to other document sheets. For example, in a case where any one or a plurality of conditions of a condition in which the opening/closing operation of the cover portion 12 is performed during the interruption, a condition in which change in the output signal of the document sheet detection sensor is made during the interruption, a condition in which there is a difference between the light receiving amount from the predetermined width region of the end part of the contact glass 65, acquired by the second reading portion 62 after inputting the resumption instruction, or the image data and the read image of the still document sheet, and other conditions is satisfied, the control portion 81 can determine that the still document sheets are changed.

When in step S124, it is determined that the still document sheets are changed (Yes in S124), since it is required to read an image of each of the still document sheets after the change, the control portion 81 executes the second reading processing in step S105 again in parallel with the first reading processing in step S104 and thereafter, performs the processing in step S106 and the subsequent processing. On the other hand, when in step S124, it is determined that the still document sheets are not changed (No in S124), it is not required to read the still image, the control portion 81 performs the processing in step S112 and the subsequent processing.

Note that although in the above-described second modified example, the processing example in which the processing to determine whether or not the still document sheets are changed in step S124 is performed is described, for example, in a case where without performing the determination processing in step S124, the following conditions are satisfied, the reading processing in step S104 and step S105 may be executed in parallel with each other. For example, it is considered that in a case where in a state in which the document sheets 9 are present on the supply tray 3a, the synthesis interruption instruction is inputted and the resumption instruction is inputted, it is highly likely that the still document sheets are changed. Therefore, without determining whether or not the still document sheets are actually changed, in a case where two conditions in which the synthesis interruption instruction is inputted in step S121 and in which the resumption instruction is inputted in step S123 are satisfied, it is deemed that the still document sheets are changed and the processing in step S104 and step S105 may be executed.

As described above, in the case where the image synthesis instruction is inputted in the image reading apparatus 1 of the present embodiment, the first reading processing using the first reading portion 61 and the second reading processing using the second reading portion 62 are executed in parallel with each other. Therefore, the image of the document sheet 9 conveyed by the automatic document feeder 2 and the image of the still document sheet on the contact glass 65 can be concurrently read. As a result, it is made possible to efficiently read the images to be synthesized, thereby allowing processing time for the synthesis processing of the read images to be shortened.

In addition, in the present embodiment, in the case where the image synthesis instruction is inputted, the document sheet 9 does not travel along the curved conveyance path 40a-40c and is conveyed along the straight conveyance path 40a-40d. Therefore, the document sheet 9 is hardly inclined during conveyance of the document sheet 9 and synthesis misalignment is hardly caused. In other words, accuracy of the synthesized image is enhanced.

In addition, in a case where the synthesis interruption instruction is inputted, the image synthesis processing is thereby interrupted, and thereafter, the image synthesis processing is resumed, the second reading processing is executed and the image of the still document sheet is read again. In other words, in a case where it is highly likely that the still document sheets are changed, the reading processing of the image of the still document sheet is automatically executed. Thus, it is not required for a worker to previously set the change of the still document sheets.

In addition, in the present embodiment, in the case where the resumption instruction is inputted, whether or not the still document sheets are changed is determined, and in the case where the still document sheets are changed, the image of each of the still document sheets is read by the second reading processing. Thus, the image of each of the changed still document sheets can be surely acquired. In addition, in a case where the still document sheets are not changed, the second reading processing is prevented from being wastefully executed.

Note that in the above-described embodiment, in a state in which the image synthesis function of the image reading apparatus 1 is not set to be effective (a state in which the image synthesis function thereof is disabled) and when the reading execution key is inputted in a state in which each of the document sheets 9 is placed only on the supply tray 3a, the control portion 81 executes either one of the first reading processing and the third reading processing. Specifically, in a case where the curved conveyance path 40a-40c is opened, the control portion 81 executes the third reading processing. In addition, in a case where the straight conveyance path 40a-40d is opened, the control portion 81 executes the first reading processing.

In addition, although in the above-described embodiment, the configuration in which on the upper surface of the apparatus main body 11, the contact glass 64 and the contact glass 65 are provided is described as an example, the present disclosure is not limited to this configuration. For example, the present disclosure is applicable to a configuration in which the contact glass 64 is not provided and a contact glass 65 whose end part on a side of the first direction D1 extends up to the reading position P2 is provided on the upper surface of the apparatus main body 11.

[Second Embodiment]

Hereinafter, schematic configurations of an image reading apparatus 1 according to a second embodiment of the present disclosure and an image forming apparatus 10 which includes the image reading apparatus 1 will be described. Since in the second embodiment described below, the constituent components in the above-described first embodiment are included, detailed description of the constituent components in common with those in the first embodiment is omitted, and only constituent components and processing contents which are different from those in the above-described first embodiment will be described.

The present embodiment is in common with the above-described first embodiment in that a first reading portion 61 reads an image (one example of a first image) of a reading surface (one example of a first reading surface) of each of document sheets 9, which passes along a carry-in passage 40a. Specifically, when each of the document sheets 9 reaches a reading position (first reading position) by the first reading portion 61 in the carry-in passage 40a, the first reading portion 61 radiates light to the reading surface of each of the document sheets 9 under conveyance and reads the image of the reading surface of each of the document sheets 9.

In the present embodiment, the first reading portion 61 is to read the image of the reading surface each of the document sheets 9 conveyed by a conveying device 4 along the carry-in passage 40a and sequentially reads a line image of one line or a plurality of lines on the reading surface from a leading end to a trailing end of each of the document sheets 9 in a conveyance direction. image data of the read line image (hereinafter, referred to as line image data) is temporarily stored in a RAM 82 (one example of a storage portion) by a control portion 81 of a control device 8. Note that hereinafter, the line image read by the first reading portion 61 is referred to as a first line image and image data thereof is referred to as first line image data.

In addition, the present embodiment is in common with the above-described first embodiment in that in a state in which a second reading portion 62 is disposed in a reference position (a position below a contact glass 64 shown in FIG. 3) corresponding to the contact glass 64, the second reading portion 62 reads an image (one example of a second image) of a reading surface (one example of a second reading surface) of each of the document sheets 9, which passes along a first conveyance path 40c. Specifically, the second reading portion 62 scans the reading surface of the still document sheet while moving to a right direction on a plane of FIG. 2 along the still document sheet placed on the contact glass 65, and the second reading portion 62 thereby reads the image of the whole region of the reading surface of the still document sheet.

In the present embodiment, the second reading portion 62 sequentially reads the line image of one line or the plurality of lines on the reading surface of the still document sheet from the leading end up to the trailing end in a movement direction of the second reading portion 62. Image data (line image data) of the read line image is temporarily stored in the later-described RAM 82 by the control portion 81. Note that the line image read by the second reading portion 62 is referred to as a second line image and the image data is referred to as second line image data.

In addition, in the present embodiment, in a case where upon non-synthesis processing, an image of each of the document sheets is read, the control portion 81 stores all the line image data from the leading end up to the trailing end of the document sheet in the RAM 82, and upon finishing reading of the document sheet up to the trailing end, the control portion 81 combines all the line image data, converts the combined line image data to a read image of the reading surface of each of the document sheets, and stores the converted read image in a storage device 83.

On the other hand, in a case where the later-described image synthesis processing is performed, the control portion 81 sequentially stores line image data corresponding to the line image sequentially read from the document sheet in the RAM 82, performs synthesized image generation processing by using the stored line image data, and thereby generates a synthesized line image, and thereafter, the line image data from which the synthesized line image originates is deleted from the RAM 82. Note that each time the image data of the synthesized line image is generated, the image data of the synthesized line image is sequentially stored in the RAM 82. Then, upon finishing reading of the document sheet up to the trailing end, by combining all the image data of the synthesized line image, the control portion 81 converts the combined image data to a synthesized image and stores the converted synthesized image in the storage device 83.

A reading control portion 8c of the control portion 81 controls the first reading portion 61, the second reading portion 62, and the like, thereby causing image reading processing to be executed.

Specifically, the reading control portion 8c executes processing in which the first reading portion 61 is caused to read the image of the reading surface of each of the document sheets 9 conveyed by the conveying device 4 (hereinafter, referred to as first reading processing). In the present embodiment, in a case where an image synthesis instruction to execute the later-described image synthesis processing is inputted, the reading control portion 8c performs processing in which the first reading portion 61 is caused to read the reading surface (the first reading surface) of each of the document sheets 9 under conveyance, the first line image is sequentially acquired, and the acquired first line image is stored in the RAM 82. In this case, the reading control portion 8c functions as a first reading processing portion in the present disclosure.

In addition, the reading control portion 8c causes the second reading portion 62 to scan while moving the second reading portion 62 along the reading surface of the still document sheet placed on the contact glass 65, thereby executing processing in which the second reading portion 62 is caused to read an image of the still document sheet (hereinafter, referred to as second reading processing). In the present embodiment, in a case where the image synthesis instruction to execute the later-described image synthesis processing is inputted or in a case where upon the non-synthesis processing, the reading instruction of the still document sheet is inputted, the reading control portion 8 performs processing in which the second reading portion 62 is caused to read the reading surface (the second reading surface) of the still document sheet, the second line image is sequentially acquired, and the acquired line image is stored in the RAM 82. In this case, the reading control portion 8c functions as a second reading processing portion in the present disclosure.

In addition, a synthesis processing portion 8d of the control portion 81 generates the synthesized image by sequentially synthesizing the first line image sequentially read in the first reading processing and the second line image sequentially read in the second reading processing each time each of the line images is read. For further details, each time the first line image and the second line image are read and stored in the RAM 82, the processing in which the line images are synthesized is performed and the synthesized line images are generated, and when the synthesized line images of the whole region of the reading surface of the document sheet are generated, the synthesized line images are combined and the synthesized image data corresponding to the reading surface of the document sheet is generated.

In addition, upon finishing the synthesis of the line images, the synthesis processing portion 8d deletes the line images used for the synthesis after generating the synthesized line image from the RAM 82.

[Synthesized Image Generation Processing]

Figure 8:
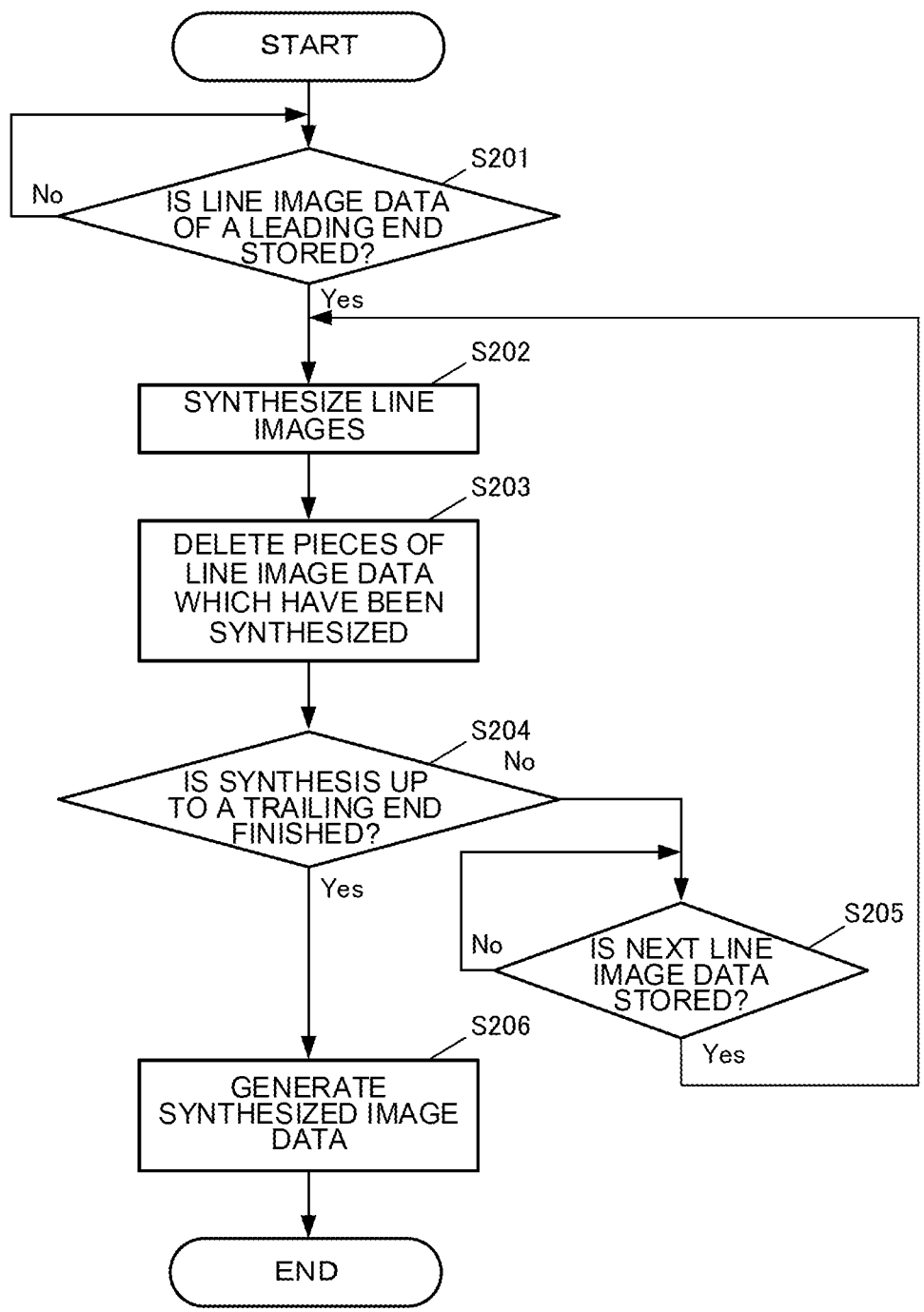
FIG. 8 is a flowchart showing one example of a procedure of synthesized image generation processing included in the image synthesis processing.

Next, with reference to a flowchart in FIG. 8, other processing example of the synthesized image generation processing in step S106 (see FIG. 5 to FIG. 7) executed by the control portion 81 of the control device 8 will be described.

In step S201, the control portion 81 determines whether or not line image data of a leading end of each of the document sheets 9 is stored in the RAM 82 by the first reading processing (S104). In addition, the control portion 81 determines whether or not line image data of a leading end of the still document sheet is stored in the RAM 82 by the second reading processing (S105).

When in step S201, it is determined that pieces of the line image data are stored in the RAM 82, the control portion 81 performs processing in which the pieces of the line image data are synthesized. The above-mentioned synthesis processing is executed based on the above-described alpha blending. Specifically, the alpha blending is executed based on a computation expression of a pixel value of synthesized pixels shown in the following expression (1).

Here, when a position of specific pixels, which correspond to each other, in the pieces of line image data is defined as $(i,j)$, a pixel value of the position $(i,j)$ in the pieces of the line image data of the document sheet 9 is defined as $f(i,j)$, a pixel value of the position $(i,j)$ in the pieces of the line image data of the still document sheet is defined as $g(i,j)$, a blending coefficient is defined as $\alpha$ ($0 \leq \alpha \leq 1$), and a pixel value (a pixel value after the synthesis) of the synthesized pixels is defined as $h(i,j)$, a pixel value $h(i,j)$ can be represented by the following expression (1).

$$h(i,j)=\alpha \cdot f(i,j)+(1-\alpha) \cdot g(i,j) \qquad (1)$$

In step S202, as to each of all pixels included in the pieces of the line image data, computation based on the computation expression is performed by the control portion 81, a computation result thereof is stored in the RAM 82. Then, when as to all the pixels of the pieces of the line image data, the computation result is stored in the RAM 82, the processing proceeds to step S203.

In step S203, the control portion 81 deletes the pieces of the line image data, which have been synthesized, from the RAM 82.

Thereafter, in step S204, the control portion 81 determines whether or not the line image data up to the trailing end (final line) of each of the document sheets has been read and the synthesis processing in step S202 for the line image data of the final line has been performed. Here, when it is determined that the synthesis processing of the line image data of the final line of each of the document sheets has not been finished, in step S205, the control portion 81 determines whether or not next line image data has been stored in the RAM 82. Then, when the next line image data has been stored in the RAM 82, the control portion 81 executes the processing in step S202 and the subsequent processing.

On the other hand, in step S204, when it is determined that the synthesis processing of the line image data of the final line has been finished, the control portion 81 combines all pixels stored in the RAM 82 and generates synthesized image data corresponding to the whole region of the reading surface of each of the document sheets (S206). Thus, the series of synthesized image generation processing is finished.

The synthesized image generation processing as described above is performed and the pieces of the line image data in the RAM 82 which have been synthesized are thereby deleted each time the synthesis processing of the line image data is finished. Thus, in the RAM 82, a capacity of a storage region (work region) used for the synthesis processing can be reduced. In other words, it is made possible to perform the synthesis processing of the image data with a small storage region.

Note that also in the second embodiment of the present disclosure, the first modified example of the image synthesis processing and the second modified example of the image synthesis processing described in the above-described first embodiment may be applied.

Note that in a case where in the second embodiment, the first modified example of the above-described image synthesis processing is applied, in step S203 in the synthesized image generation processing, since the line image data stored in the RAM 82 is used for the synthesis processing of the second and subsequent document sheets 9, the line image data stored therein is not deleted and only the pieces of the line image data of each of the document sheets 9 which have already been synthesized are deleted.

In addition, in a case where also in the second embodiment of the present disclosure, the second modified example of the image synthesis processing which exhibits effect similar to the effect of the above-described first embodiment is applied, in step S203 in the synthesized image generation processing, since the line image data stored in the RAM 82 is used for the synthesis processing of the second and subsequent document sheets 9, the line image data stored therein is not deleted and only the pieces of the line image data of each of the document sheets 9 which have already been synthesized are deleted.

In addition, the present disclosure can be regarded as the image forming apparatus 10 which includes the image reading apparatus 1 according to the above-described first embodiment and second embodiment.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading apparatus comprising:
a conveyance portion configured to convey a first medium to a predetermined reading position;
a first imaging portion provided in a first reading position on a conveyance path of the first medium;
a first reading processing portion configured to cause the first imaging portion to read a first image of a first reading surface of the first medium conveyed by the conveyance portion;

a second imaging portion provided below a medium placement surface;

a second reading processing portion configured to cause the second imaging portion to read a second image of a second reading surface of a second medium by scanning while the second imaging portion is being moved along the second reading surface of the second medium placed on the medium placement surface;

a reading control portion configured to control the first reading processing portion and the second reading processing portion to operate in parallel with each other; and a synthesis processing portion configured to generate a synthesized image by synthesizing the first image read by the first reading processing portion and the second image read by the second reading processing portion, wherein upon reading the second medium, the second imaging portion is to scan the second reading surface of the second medium by moving from a predetermined reference position, the conveyance path includes:
  a first conveyance path configured to extend from a predetermined branch point via a second reading position by the second imaging portion disposed in the predetermined reference position to a first discharge outlet and
  a second conveyance path configured to extend from the predetermined branch point to a second discharge outlet without passing through the second reading position, the image reading apparatus further comprising:
    a route switch portion configured to be displaced to either of a first position where the first medium conveyed by the conveyance portion is guidable to the first conveyance path or a second position where the first medium is guidable to the second conveyance path, and
    a third reading processing portion configured to, in a case where the route switch portion is disposed in the first position, cause the second imaging portion to read the first reading surface of the first medium conveyed by the conveyance portion in the second reading position, and
  in a case where an image synthesis instruction is inputted and the route switch portion is disposed in the second position, the reading control portion controls the first reading processing portion and the second reading processing portion to operate in parallel with each other.

2. The image reading apparatus according to claim 1, wherein in a case where in response to input of a synthesis interruption instruction, processing by the synthesis processing portion is interrupted and after interruption, in response to input of a resumption instruction, the processing by the synthesis processing portion is resumed, the reading control portion causes the second reading processing portion to operate again and causes the second imaging portion to read the second reading surface.

3. The image reading apparatus according to claim 2, wherein in a case where the resumption instruction is inputted, the reading control portion determines whether or not the second medium on the medium placement surface is changed and in a case where the second medium is changed, the reading control portion causes the second reading processing portion to operate again and to read the second reading surface.

* * * * *